US00RE41141E

(19) United States
(12) Reissued Patent
Smith et al.

(10) Patent Number: US RE41,141 E
(45) Date of Reissued Patent: Feb. 23, 2010

(54) COMBINED DRILLING APPARATUS AND METHOD

(75) Inventors: Michael L. Smith, Banquete, TX (US); Leslie D. Skinner, Houston, TX (US); Charles C. Overstreet, Katy, TX (US)

(73) Assignee: Cudd Pressure Control, Inc., Houston, TX (US)

(21) Appl. No.: 10/317,675

(22) Filed: Dec. 12, 2002

(Under 37 CFR 1.47)

Related U.S. Patent Documents

Reissue of:
(64) Patent No.: 6,158,516
Issued: Dec. 12, 2000
Appl. No.: 09/203,838
Filed: Dec. 2, 1998

(51) Int. Cl.
*E21B 19/08* (2006.01)

(52) U.S. Cl. ..... 166/385; 166/77.1; 175/89
(58) Field of Classification Search ..... 166/385, 166/381, 77.1, 77.3, 77.2, 384; 175/62, 57, 175/89, 113
See application file for complete search history.

(56) References Cited

U.S. PATENT DOCUMENTS

| | | | | |
|---|---|---|---|---|
| 4,042,123 | A | | 8/1977 | Sheldon et al. |
| 4,044,895 | A | | 8/1977 | Adair |
| 4,077,525 | A | | 3/1978 | Callegari et al. |
| 4,251,176 | A | | 2/1981 | Sizer et al. |
| 4,269,554 | A | | 5/1981 | Jackson |
| 4,531,875 | A | | 7/1985 | Krueger |
| 4,586,572 | A | | 5/1986 | Myers et al. |
| 4,621,974 | A | | 11/1986 | Krueger |
| 4,655,291 | A | * | 4/1987 | Cox |
| 4,696,207 | A | | 9/1987 | Boyadjieff |
| 4,709,766 | A | | 12/1987 | Boyadjieff |
| 4,725,179 | A | | 2/1988 | Woolslayer et al. |
| 4,765,401 | A | | 8/1988 | Boyadjieff |
| 4,899,832 | A | | 2/1990 | Bierscheid, Jr. |
| 5,094,340 | A | * | 3/1992 | Avakov |
| 5,133,405 | A | * | 7/1992 | Elliston |
| 5,174,389 | A | | 12/1992 | Hansen |
| 5,180,012 | A | * | 1/1993 | Crawford ..... 166/301 |

(Continued)

OTHER PUBLICATIONS

Publication of Society of Petroleum Engineers (SPE 26538): "A Spoolable Coiled—Turbine Gas—Lift Completion System", by E.J. Walker, J.L. Hendrix and K.J. Humphrey, BP Exploration(Alaska) Inc.; B.K. Moore, Nowcam Services, Inc.; and R.R. Whitlow, Orbis Engineering, Inc.*
Hydraulic Power Technology Texas, Inc. Brochure: "HPT CTU's & Injectors . . . Power, Quality, Price and Service".*

*Primary Examiner*—Shane Bomar
(74) *Attorney, Agent, or Firm*—Winstead PC; Henry L. Ehrlich

(57) ABSTRACT

Method and apparatus for drilling, completion, well workovers and well control, combining an integrated lifting unit and a coiled tubing unit, the method and apparatus permit running jointed pipe and coil tubing in combination, and standing multiple joints of pipe near the unit. The invention combines a hydraulic pipe hoisting system, pipe handling systems and pipe racking containment apparatus. A hydraulic workover jack is combined with a multifunction injector head and a standpipe for fluid circulation. The invention may also include a rotary table for rotating pipe and/or a rotating power swivel to allow fluid circulation during pipe rotation. Also included are a gin pole, a winching system for jointed pipe, and a traveling head with traveling slips and stationary slips to allow pipe movement in the well. Hydraulic systems allow insertion and extraction of tools in a work string. The apparatus includes spoolable drill pipe including a connector, multi-section reel with core, connection to reel for fluid circulation, reel drive mechanism and a pipe pulling capability.

77 Claims, 10 Drawing Sheets

U.S. PATENT DOCUMENTS 5,183,122 A 2/1993 Rowbotham et al.
5,215,151 A * 6/1993 Smith et al.
5,244,046 A * 9/1993 Council et al.
5,291,956 A * 3/1994 Mueller et al. ..... 175/67
5,423,390 A 6/1995 Donnally et al.
5,441,119 A * 8/1995 Head
5,660,235 A * 8/1997 Sola
5,711,382 A 1/1998 Hansen et al.
5,738,173 A * 4/1998 Burge et al. ..... 166/385
5,988,299 A 11/1999 Hansen et al.

* cited by examiner

COMBINED DRILLING APPARATUS AND METHOD

Matter enclosed in heavy brackets [ ] appears in the original patent but forms no part of this reissue specification; matter printed in italics indicates the additions made by reissue.

BACKGROUND AND SUMMARY OF THE INVENTION

Field of the Invention

This invention relates to an integration of a hydraulic workover or "snubbing" unit and a coil tubing unit with applications including drilling, completion, well workovers and well control. Unique features of the system are: the ability to vertically stand multiple joints and pipe near the unit as opposed to laying down each joint as done in conventional operations, the combined capability of a hydraulic workover or "snubbing" unit and a coiled tubing unit in one piece of equipment, the ability to run jointed pipe in combination with coil tubing, the ability to run coil tubing in combination with jointed pipe, the use of a single hydraulic power pack to operate the jack and/or coil tubing unit, and the ability to circulate fluid while rotating and reciprocating the pipe or coiled tubing.

Various prior art inventions of interest are as follows:

U.S. Pat. No. 5,738,173, to Burge et al.(Baker Hughes), describes apparatus for and method of installing both tubing and pipe in a well. U.S. Pat. No. 4,515,220, to Sizer et al. (Otis Engineering), describes apparatus for and method of installing both coiled tubing and also jointed pipe in a well. U.S. Pat. No. 4,655,291, to Cox (Otis Engineering), shows apparatus and method for installing both coiled tubing and also jointed pipe in a well. U.S. Pat. No. 5,244,046, to Council et al. (Otis Engineering), shows a tubing injecting unit adapted to install both tubing and also wireline tools into a well. U.S. Pat. No. 5,094,340, to Avakov (Otis Engineering), sets forth gripping blocks adapted to handle coiled tubing, jointed pipe, and still other elongate objects for installation in a well.

Other related art is disclosed in Patent Numbers U.S. Pat. No. 3,191,450, to Wilson, U.S. Pat. No. 3,215,203, to Sizer, U.S. Pat. No. 3,285,485, to Slator, U.S. Pat. No. 3,313,346, to Cross, U.S. Pat. No. 3,559,905, to Palynchuk, U.S. Pat. No. 3,677,345, to Sizer, U.S. Pat. No. 3,754,474, to Palynchuk, U.S. Pat. No. 4,085,796, to Council, U.S. Pat. No. 4,251,176, to Sizer, U.S. Pat. No. 4,515,220, to Sizer, Cox and Council, which along with U.S. Pat. No. 5,738,173, to Burge, U.S. Pat. No. 4,515,220, to Sizer, U.S. Pat. No. 4,655,291, to Cox, U.S. Pat. No. 5,244,046, to Council, U.S. Pat. No. 5,094,340, to Avakov, are hereby fully incorporated by reference for all they disclose.

The above art illustrates conventional coiled tubing operations, which like conventional jointed pipe drilling has certain deficiencies. Coiled tubing used in drilling applications can not be rotated without rotating the reel, guide arch and injector about the centerline of the well or cutting the coiled tubing and installing a connector to permit rotating the pipe then in the hole. In the former case, string rotational speed is limited to the safe rotational speed of the entire bulky assembly. In the latter situation, the coiled tubing cannot be rotated and run into or pulled out of the hole simultaneously. The absence of rotational capability requires the use of a down hole motor to drill and an orienting tool downhole to adjust toolface position during directional drilling.

The coiled tubing must be cut, and a connector installed, each time a piece of "jewelry" is added to the drillstring above the bottomhole assembly. Each such item must be removed before the pipe can be spooled onto the reel unless the item is specifically designed to be spoolable. Each time a connector is added to a coiled tubing string, a stress raiser is intentionally applied in the continuous pipe string, which reduces both string utility in other applications and string life in general.

Coiled tubing reels and support structures are heavy. The combined weight of a fully loaded spool may exceed platform crane rated capacity requiring an upgrade or a separate "bull frog" crane on some platforms to lift the reel into place for coiled tubing drilling. This is even more important as coiled tubing diameters and wall thicknesses increase for deeper drilling applications, the current trend. Lifting such heavy loads with limited cranes increases the potential for accidents including damage to equipment and injuries to personnel.

Jointed pipe drilling requires excessive time to trip drillpipe for changes to the string or drilling tools. A derrick or other structure is required to provide hoisting and racking capabilities for jointed-tubing tripping with attendant weight, space and maintenance requirements.

Jointed-pipe handling is discontinuous. Stopping and starting is required for each connection make-up or breakout required. Multiple steps are required for each such connection make-up or breakout required, each of which places operating personnel at some risk. Further, multiple equipment functions are required which relates to wear, maintenance, replacement and cost. Failure is possible at each point, any one of which can shut down operations for varying time periods.

The present invention achieves several advantages and improvements over conventional prior art methods and apparatus. Jointed drillpipe can be delivered in small units with weights far less than the combined weight of a loaded coiled tubing reel. Only one large reel is needed for the system instead of several when large diameter drillpipe is used for drilling deep wells. This reel is only used for tripping the drillpipe, not for shipment. The reel alternatively is in multiple pieces that are assembled on-site instead of a single large unit, or the reel may be a single collapsible unit that is expanded on-site. Either of these removes shipping complications associated with a large-diameter reel and support structure.

Pipe is unscrewed, straightened and shipped back in basket-sized units after its last use in the well. Similarly the reel is either dismantled or re-collapsed for shipment after the job.

Improvements in operation are also achieved. The pipe, once run in the hole in "singles," can be reeled out of the hole, then back in, without breaking apart except as needed. This reduces trip time associated with jointed-pipe systems and overall cost. Drillpipe tripping is a continuous process, which reduces the potential for differential sticking while tripping. Well control issues are simplified since monitoring for kicks, filling the hole and observing fluid levels are also continuous processes. Well control measures can be enacted quickly since the spoolable drillpipe is always connected to the pump through the reel swivel. Pumping can be initiated without positioning a drillpipe body across a blow out preventer and stabbing a kelly or valve onto an open drillpipe connection. If flush joint or non upset external tubing spoolable drillpipe is used, blow out preventors can be activated even if a joint is situated in the rams.

With the present invention, a derrick or other support system for hoisting jointed pipe and racking it back is not required. Pipe can be unscrewed and disconnected from the reel at any connection allowing the entire string to be rotated and raised or lowered by adding or removing single joints. Thus, the system can go from continuous (reeled) to jointed at any time. The pipe can be rotated while drilling to orient downhole directional tools since the spoolable feature is generally only used for tripping, although drilling with a downhole motor is possible. During drilling, the system is a jointed-pipe operation. The entire string can be rotated at common speeds (RPMs) so it need not rely entirely on downhole motors for supplying rotation to the bit.

With the present invention, make-up and break-out equipment is used less frequently than with conventional jointed-pipe systems reducing maintenance, pipe-handling, replacement and personnel risk issues and, thus, costs. Personnel are not overly fatigued if multiple trips are required during a single tour, particularly at moderate to extended depths. Fewer steps with less intensive physical strength are required for tripping which will probably result in fewer injuries and work-related illnesses. Fewer crew members may be required. Automation or computer-assist systems can be incorporated with this system including real-time monitoring, level wind assist, pipe tensioning, etc. for improved efficiency with resultant cost reductions. This improved system can be used in either drilling or reworking operations on existing wells.

In summary, deficiencies of conventional hydraulic workover operations without a derrick are: each joint must be unscrewed from every other joint; it is not possible to continuously circulate while tripping; pipe handling is required to lay down each joint as it is pulled from the hole, which involves wear on hoisting equipment and some risk to personnel; trip time is slow in view of the above; and, a structure is required of sufficient area size and strength to hold and support the dry weight of pipe removed from the hole.

Deficiencies of conventional coiled tubing drilling are: lack of rotation; continual slide mode; excessive weight of tubulars and coil tubing reel; short tubular life due to the effects of low cycle fatigue; reduced capabilities in running jointed tubulars (bottom hole assemblies, and completions); non-competitive day rates; decreased penetration rates vs. hydraulic workover unit or rig due to lower weight on bit and inability to overcome friction; lower hydraulic efficiencies vs. conventional tubing due to reduced coiled tubing sizes; lesser hole cleaning capabilities; and, higher cost of pumping equipment due to lower hydraulic efficiencies.

It is thus desirable to combine advantages of coil tubing: continuous pumping while tripping; underbalanced drilling; faster trip time versus hydraulic workover unit or rig; smaller footprint vs. rig; less personnel required; and, reduction of personnel time required to work on a platform close to well with those of a hydraulic workover unit: the ability to rotate during all facets of job including underbalanced drilling and while tripping pipe; the ability to use segmented components better suited for existing crane capacities; running larger tubulars; running completion strings; greater hook loads; the ability to convey different diameter tubulars; a smaller footprint vs. rig or coiled tubing unit since some of the equipment is on the well; higher hydraulic efficiencies; greater hole cleaning capabilities; higher pressure capabilities for comparable tubulars; and, longer tubular useful life vs. coil tubing unit.

Previous attempts to combine some of hydraulic workover and coiled tubing operations also had deficiencies. Jointed pipe had to be handled by the snubbing unit while the coiled tubing injector is rigged down or "trollied" off the well centerline. Injector head lifting or snubbing force capacities were less than those of the snubbing unit in most cases which, in turn, limited the depth to which large-diameter coiled tubing could be run. With previous attempts and apparatus the coiled tubing must be cut to rig down or trolley the injector head out of the way. Excessive time is required to run or pull combinations of externally-upset end (EUE) jointed pipe and coiled tubing with prior apparatus since the injector must be rigged down or moved each time an EUE goes into or out of the well. This results in higher costs than using coiled tubing alone.

In summary, the present invention achieves the following improvements: EUE jointed pipe, non-upset jointed pipe and continuous pipe can be handled with a single unit, which does not require the coiled pipe to be cut to go from one pipe type to another.

In the event the injector head mechanically fails during a job, the coiled tubing can be run or pulled using the hydraulic jack. Similarly, if the jack fails, coiled tubing operations can continue (but jointed tubing operations can not). The injector head of the present invention does not need to be rigged down on trollied off the well centerline as a unit. Instead, the head splits apart with each half being moved back only the distance required for an EUE and collar on jointed pipe to clear the chains. The injector can be moved back into place hydraulically by the operator from the control console. This reduces time, risk to personnel and overall job cost to the customer.

Controls can be integrated so that a single operator can operate all system functions without switching from one piece of equipment to another. In other words, hydraulic workover operations can be replaced by coiled tubing operations by simply moving to a different set of control handles. A single power pack (hydraulic pump and engine) can be used for both operations instead of a separate one for each function, since when one system is in use, the other will not be under normal circumstances. However, both can be used simultaneously in other situations (jack assist of the coiled tubing injector to pull a heavy load, for example).

Well control equipment, blowout preventers (BOPs) and valves, for both equipment sets can be manifolded together using the same accumulator system so that either one or both can be functioned in the event of a well control incident.

The jack of the present invention is equipped with a rotary drive mechanism that can turn the entire pipe string as long as the coiled tubing is not connected to the reel. This provides the means to reduce trip time for jointed sections by allowing pipe to be "rotated out of the hole" (i.e., the top pipe can be held stationary and the bottom segment in the well can be rotated clockwise to unscrew right-hand threads and break the connection between pipe segments).

Jointed members can be snubbed into and out of the hole under pressure. This obviates killing the well to pull jointed tubulars such as bottomhole assemblies, a current requirement of conventional coiled tubing drilling. Thus, the well can be maintained in an underbalanced situation throughout the drilling process. Completion equipment, including jointed production tubing, packers, profile nipples, blast joints, on-off tools, gravel pack screens, landing nipples, etc. can be run with the jack following coiled tubing operations such as drilling, recompletions or workovers without killing the well.

The present invention may also include a "rack-back" system. If so, multiple joints can be stood back, which reduces the number of joint breaks required in conventional hydraulic workover, tubing is not laid down; rather it is stood back vertically in fingerboards in multiple joint sections reducing hoisting equipment wear and personnel risk, and trip time is reduced along with overall operation cost.

Dry tubing weight can be supported by the earth, the platform or the wellhead depending on which base is used for standing the tubing. This allows its use on minimal structures lacking "normal" support capabilities such as: offshore satellite (monopod) platforms; old, physically damaged or corroded platforms; and, inshore well protection structures (i.e., no platform).

With this added rack back system component, a supplemental structure such as a barge, lift boat, offset platform or other structure is not required to hold the horizontal tubing segments since the pipe is stood almost vertically in the wellbore vicinity. This may reduce overall job costs, and fewer opportunities exist for tubular damage due to handling which reduces equipment replacement costs and economic risk to the customer (i.e., fewer threads are exposed to damage during breakout, hoisting and laydown operations).

With the added components comprising a spoolable drillpipe system, jointed drillpipe can be delivered in small units with weights far less than the combined weight of a loaded coiled tubing reel. Only one large reel is needed for the system instead of several when large diameter drillpipe is used for drilling deep wells. This reel need only used for tripping the drillpipe, not for shipment. The reel is in multiple pieces that are assembled on-site instead of a single large unit. Alternatively, the reel would be a single collapsible unit that is expanded on-site. Either of these removes shipping complications associated with a large-diameter reel and support structure. Pipe is unscrewed, straightened and shipped back in basket-sized units after its last use in the well. Similarly the reel is either dismantled or recollapsed for shipment after the job.

SUMMARY OF THE INVENTION

Figure 1:
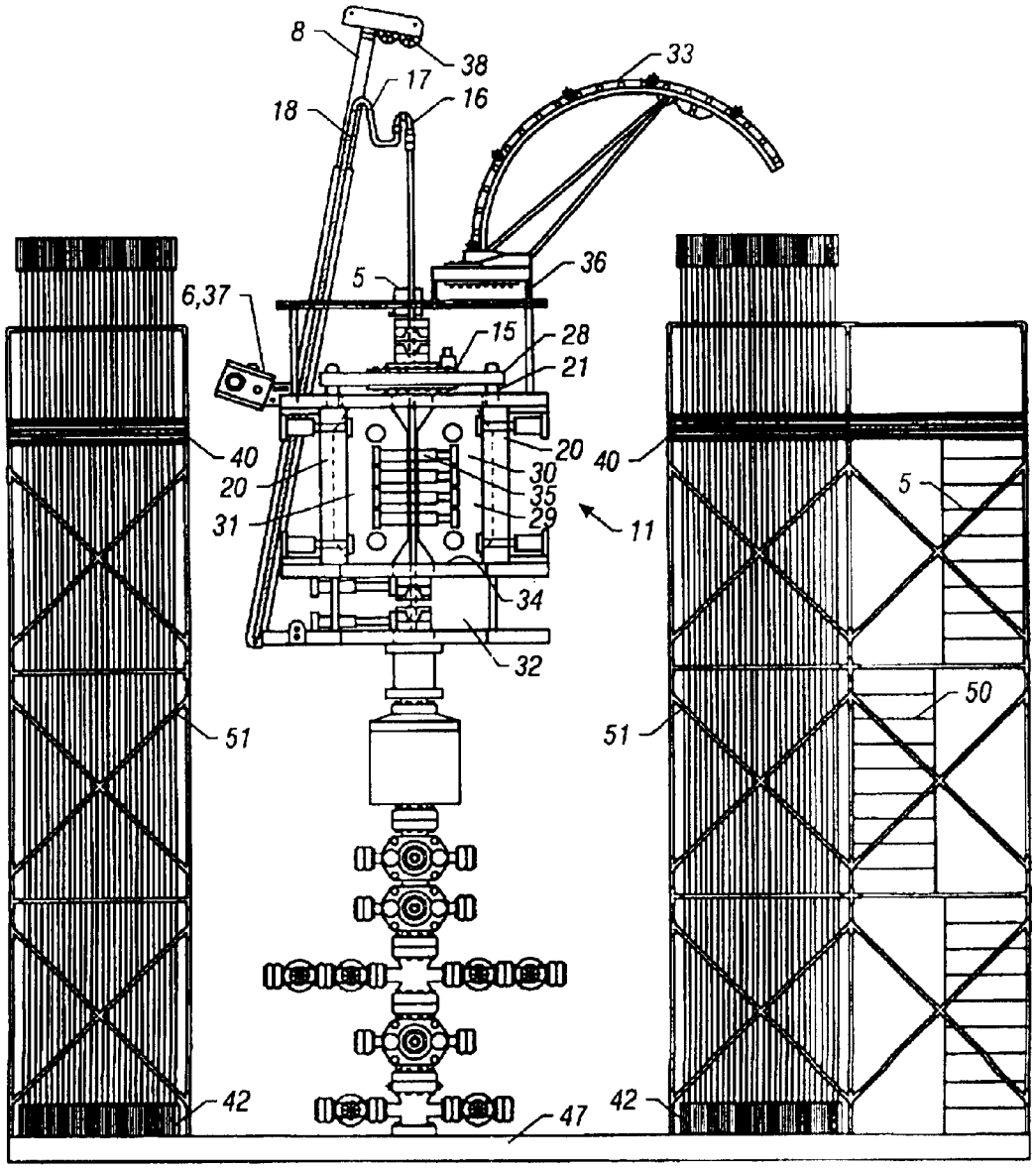
FIG. 1—is an elevation of the combined coil tubing and hydraulic workover apparatus and a pipe rack back system atop a well head.

The focus of the present invention is to provide a new and improved method and apparatus for drilling, completion, well workovers and well control, combining an integrated hydraulic jacking lifting unit and a coiled tubing unit, the method and apparatus permit running jointed pipe and coil tubing in combination, and extending or racking and multiple joints of pipe near the unit. The method and apparatus includes spoolable drill pipe including a connector, multi-section reel with core, connection to reel for fluid circulation, reel drive mechanism and a pipe pulling capability.

The present invention comprises the following components: a hydraulic pipe hoisting system (both 2 and 4 legged embodiments are contemplated), a work basket atop the jack, a rotary table within the traveling head, a rotating swivel to allow fluid circulation during pipe rotation, pipe handling tongs onboard the work basket, pipe racking (finger) boards attached to the frame or work basket and pipe containment bases for the purpose of racking back pipe (standing single or double joints), a hydraulic workover or snubbing jack bore sufficiently large to run casing, bottom hole assembly and well tubulars (up to a least a nominal 14" bore is suggested), a multi-function injector head, a guide arch assembly (or gooseneck), a standpipe for the purposes of fluid circulation, high pressure connections on each end of the standpipe to allow pumping, a gin pole or boom to handle and convey casing, tubing, drilling assemblies and completion tools, a multiplicity of sheaves on the top of the gin pole for handling pipe and other required services for general oilfield operations, a winching system to hoist jointed pipe and to set it down in the racking frame or lift it from the racking frame, a sub-base to allow weight distribution of the unit and pipe in a safe and efficient manner on the deck of the platform or centralized on the wellhead, at least one operator's console and a work area for controlling and operating the invention, traveling head with traveling slips and stationary slips for pipe movement in the well, hydraulic cylinders for insertion and extraction of the injector head radially relative to the centerline of the wellbore and unit, a work window to allow access to the stationary slips and for insertion and extraction of tools in the work string and, spoolable drill pipe including a connector, multi-section reel with core, connection to reel for fluid circulation, reel drive mechanism and a pipe pulling capability.

The invention involves track and trolleys or other suitable guides for moving the gooseneck and/or the injector head. The multi-function injector head is capable of splitting into two halves to facilitate running of large BHA's into and out of the wellbore. The injector head will move via a guide system, such as a dove tail rails, or any other guide means, radially away from the centerline of the wellbore. Hydraulic pistons translate the two halves toward each other and hold it in place.

As to the manner of operation and use of the present invention, the same is made apparent from the above in consideration of the following discussion and description of the details of the present invention.

DESCRIPTION OF THE PREFERRED EMBODIMENTS

Snubbing is a generic term known in the art which covers the processes involved in running tubular goods (coil tubing or pipe) into or out of a wellbore while there is a surface pressure or the possibility thereof. The term snubbing refers to both stripping and snubbing.

Stripping is the movement of tubular goods when the pipe weight exceeds the pressure excerpted on the tubulars. In other words, the pipe must be restrained from falling into the wellbore. Snubbing is the movement of tubulars when the pressure excerpted on them is greater than their buoyed weight. This means that the tubulars must be restrained from coming out of the wellbore.

Hydraulic jacking or workover "snubbing" units were developed and refined primarily in the control of run away wells. Snubbing units now are more general purpose tools in the specialized oil control service industry and provide many advantages in protecting, producing formations and reducing work over and drilling costs.

Self contained units are trailer mounted or skid mounted for quick transport and fast rig up on wellheads on land or offshore. Modular components conformed to space limitations at a particular site and are easily transported. A workover snubbing unit and blow out preventor assembly (BOP) can be flanged directly to the top of a wellhead and all weight is generally supported through the wellhead center line, so compact units are ideal for working from non-load bearing satellite platforms, as well as other crowded platforms such as offshore platforms and drilling rig floors.

Figure 2:
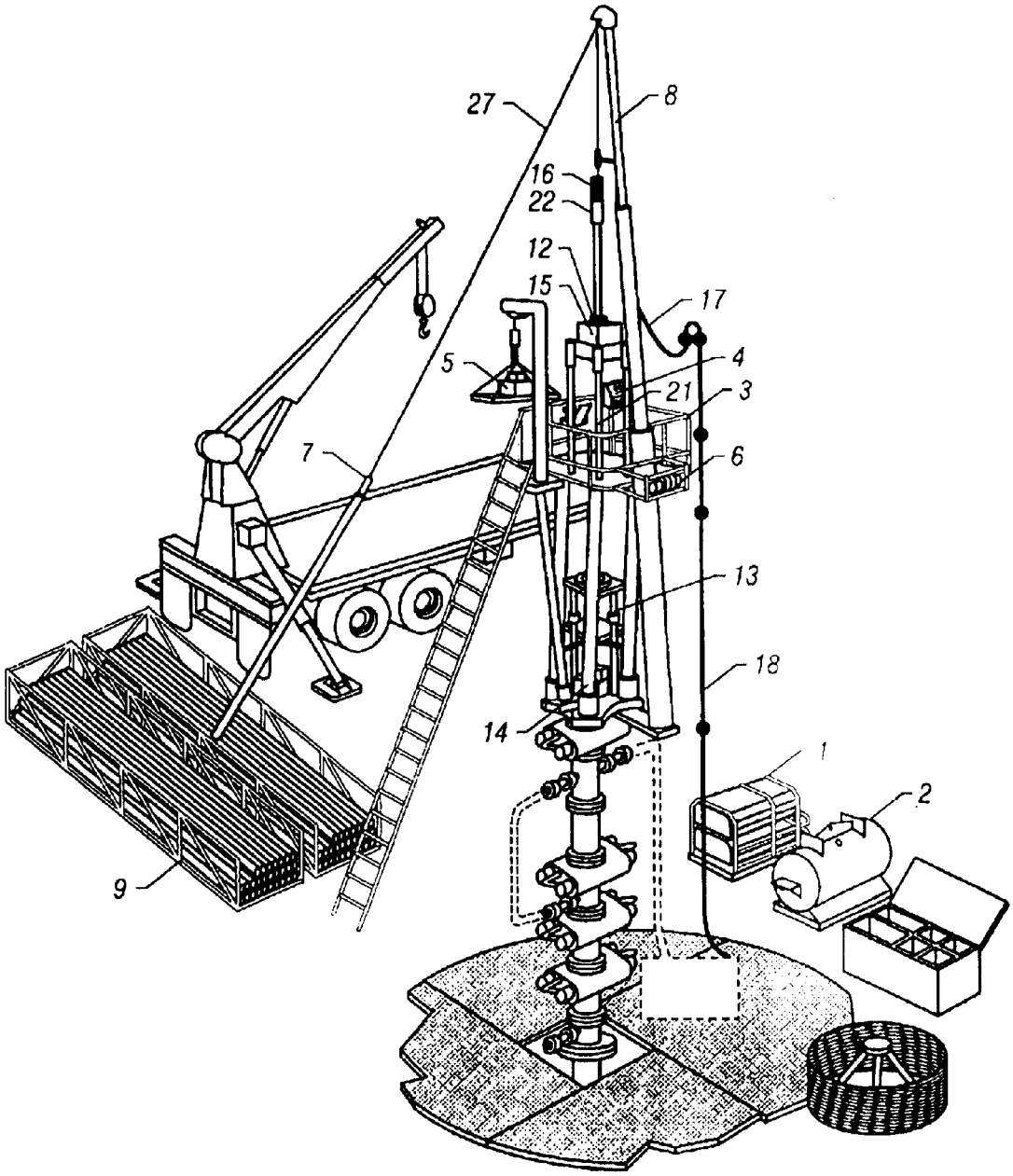
FIG. 2—is a perspective drawing of a conventional prior art snubbing apparatus and horizontal pipe racks.

FIG. 2 illustrates the following functional groups and components of a conventional hydraulic workover or snubbing unit: powerpack and hydraulic pumps 1, fuel tank 2, tool box and work basket 3; control panels 4, power tongs 5; counter balance winches 6, pipe elevators 7, ginpole 8, and pipe racks 9; hydraulic jack assembly 11, traveling 12 and stationary 13 slips, stripper 14, and built in rotary table 15; and, circulating swivel 16, kelly hose 17, and standpipe 18.

Hydraulic power supply is from the skid mounted diesel engine with hydraulic pumps mounted to the main shaft gear box. For auxiliary power functions, a separate pump may be mounted to the engine cam shaft.

A work basket 3 is positioned on top of the hydraulic jack assembly 11 where is mounted a control console 4 for the unit. Working from this control console 4, the operator can direct the speed and direction of the traveling head and slip assembly, the operation of the slips and torque and direction of the rotary table 15. The counter balance pipe winch 6 and pipe elevator 7 system, simultaneously handle one joint of pipe while laying down or picking up another. Thus, a crew can work smoothly and efficiently, reducing the damage to tubing.

Four hydraulic cylinders 20 of the snubbing unit are arranged around the vertical axes and tubing guide of the unit. The traveling slips 12 and a built in hydraulic rotary table 15 are contained in the traveling head which is attached to the top of the hydraulic cylinder rods 21. Stationary slips 13 are attached to the base of the unit.

Operators within the work basket 3 control the hydraulic jack assembly 11, slip bowls 12 and 13, rotary table 15, bleed off and equalizing valves, blow out preventor controls and counter balance controls. In some instances, operations controlled from the work basket can also function to handle power tongs 5 and large diameter tubulars.

When the tubing is being handled, care must be used to prevent damage. When picking up or laying tubing down, damage often occurs when connections come into contact with "V" doors, cat walks, hand rails, valves, elevators, etc. Stabbing guides 22 can be used when making up premium threaded tubulars to prevent any wobble and thus to prevent pin and box damage to the threaded tubulars.

With reference to the above described background of the prior art conventional snubbing apparatus as illustrated in FIG. 2, the following will be a detailed description of the new and improved apparatus and methods of the present invention. Referring first to FIG. 1, various components and sub assemblies of the present invention will be described. Where equivalent structure to that of the previously described snubbing apparatus is found, like reference numerals will be used to describe like components.

Figure 3:
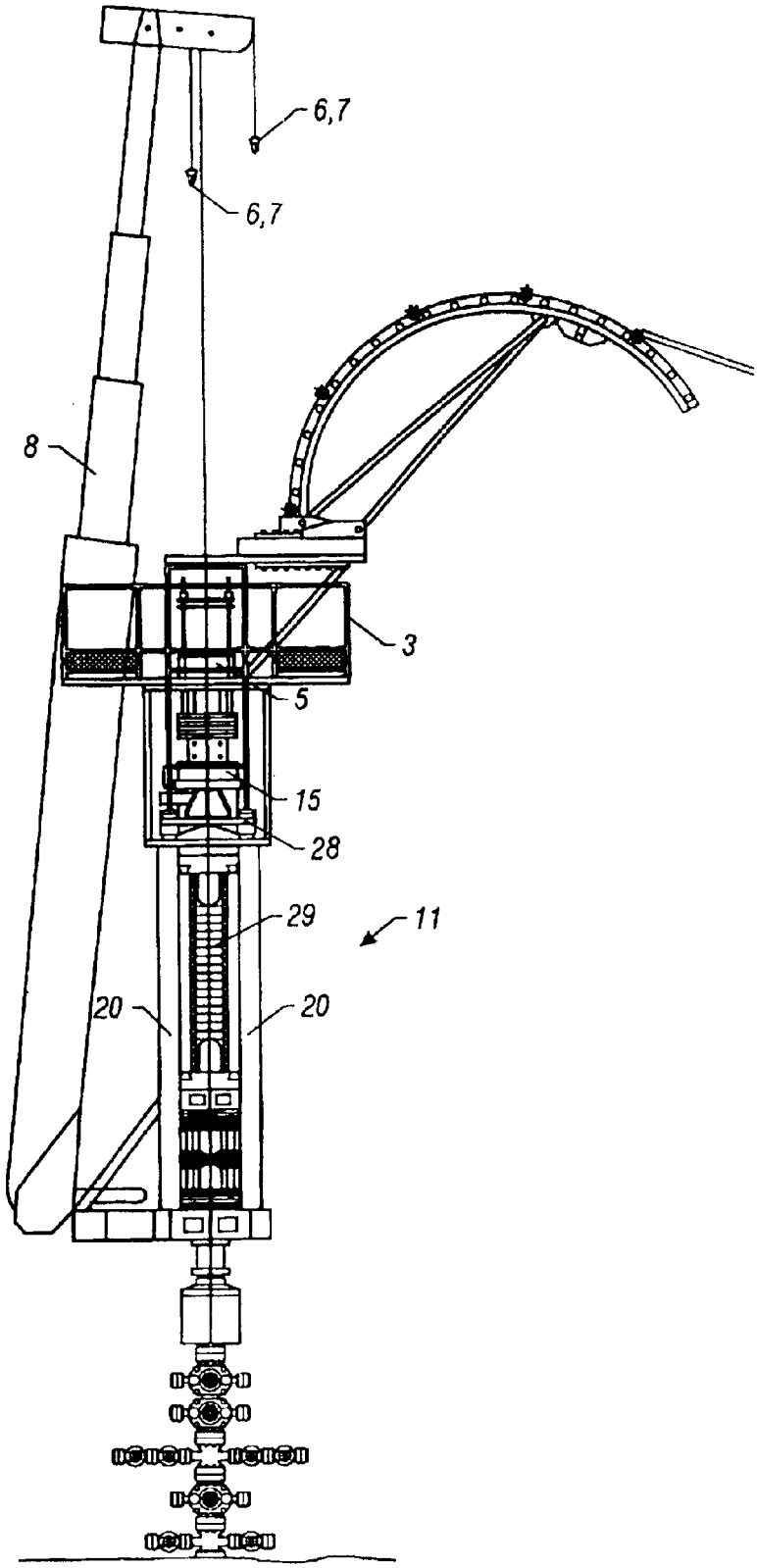
FIG. 3—is an enlarged elevation of the combination drilling and snubbing apparatus showing the guide arch trolley assembly.
Figure 4:
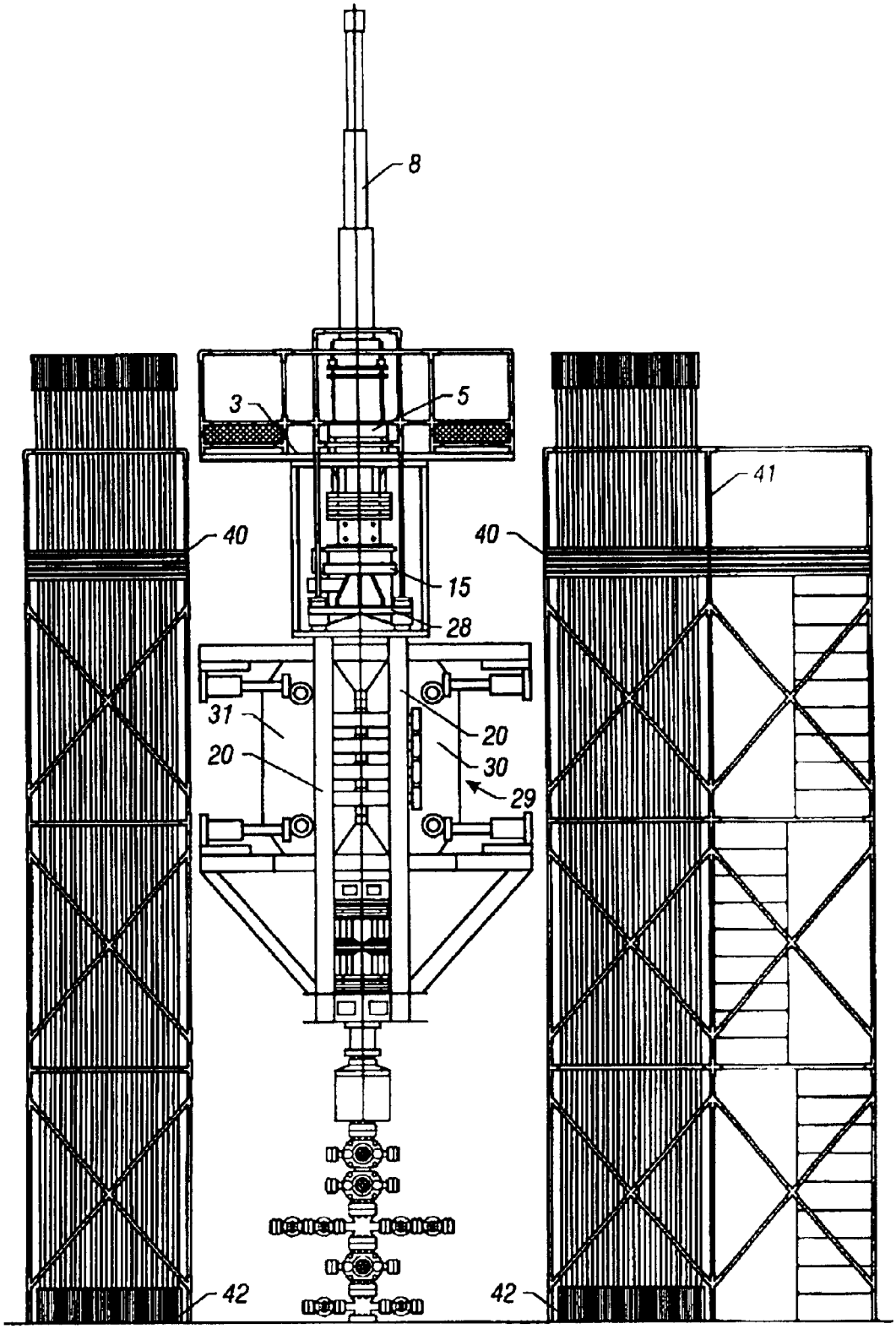
FIG. 4—is a side elevation, 90° to that of FIG. 3 of the combination coil tubing and snubbing drilling apparatus illustrating the rack back pipe racking assembly and scaffolding and access stair assembly.

FIG. 1 illustrates a hydraulic jack assembly or pipe hoisting system in a four legged embodiment, that is with four hydraulic jack cylinders 20. Alternative embodiments contemplated would use two legged configuration. FIG. 1 does not illustrate the work basket atop the jack. The work basket 3, atop the jack, is best illustrated in FIGS. 3 and 4. FIGS. 1, 3, and 4 all illustrate the rotary table 15 with the traveling head 28 and pipe handling tong 5 mounted above the traveling slip bowls 12. The embodiment illustrated in FIGS. 1, 3, and 4 illustrates an axially aligned power tong 5 with a base plate such as as illustrated in more detail in FIG. 8 to apply a torque sufficient to the size tubing worked. Optionally, the present invention could be used with hanging power tong 5 and a rotating tong arm such as that illustrated on the snubbing unit in FIG. 2.

Figure 8:
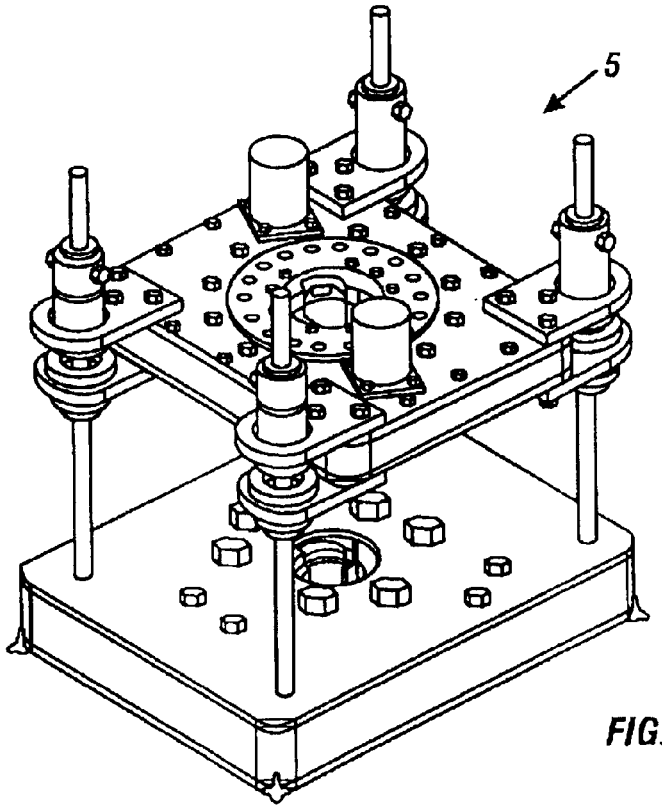
FIG. 8—illustrates an embodiment of a power tong assembly for use in combination with the present invention.
Figure 9:
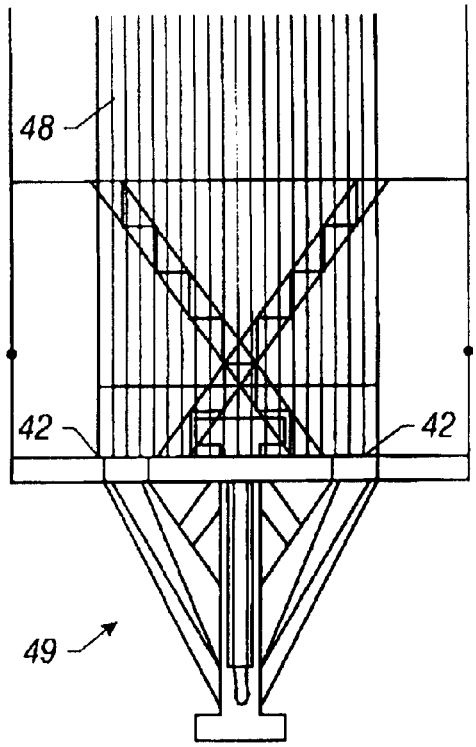
FIG. 9—illustrates a side elevation of a sub-base for optional use to allow weight distribution for the unit and pipe rack.

As shown in FIG. 1, the present invention includes a rotating swivel 16 to allow for pipe rotation while circulating. The power tong 5 as illustrated in FIGS. 3, 4, and 8 is mounted to a frame work above the slip bowls of the traveling slip and the hydraulic powered rotary so that although the slip bowls 12 are free to rotate via the rotary table 15, the power tong unit itself is stationary.

FIGS. 1, 3, 4, 6, and 7 also illustrate a multi-function injector head 29. The injector head is capable of splitting into two halves 30 and 31 so as to move horizontally the halves and radially away from the center line of the well bore. Alternative orientations, 90° apart, are illustrated in FIG. 1 as compared to FIGS. 3 and 4. The configuration will depend on the clearances needed upon retraction or opening and the size and configuration of the other components of the unit, as there is obviously less room to move an injector half 31 toward the gin pole 8 (FIG. 1) compared to moving half 31 unobstructedly (FIG. 4). The injector head is mounted above the stationary slips 13 and within the window defined by the jack legs 20 of the hydraulic jack assembly 11. As with the guide arch assembly or gooseneck 33 which will be described in more detail below, the two halves 30 and 31 of the multi function injector head 29 can move via a guided system 34 away from the center line of the well bore. Hydraulic pistons 35 translate the two halves toward or away from each other as desired and hold them in place.

Figure 6:
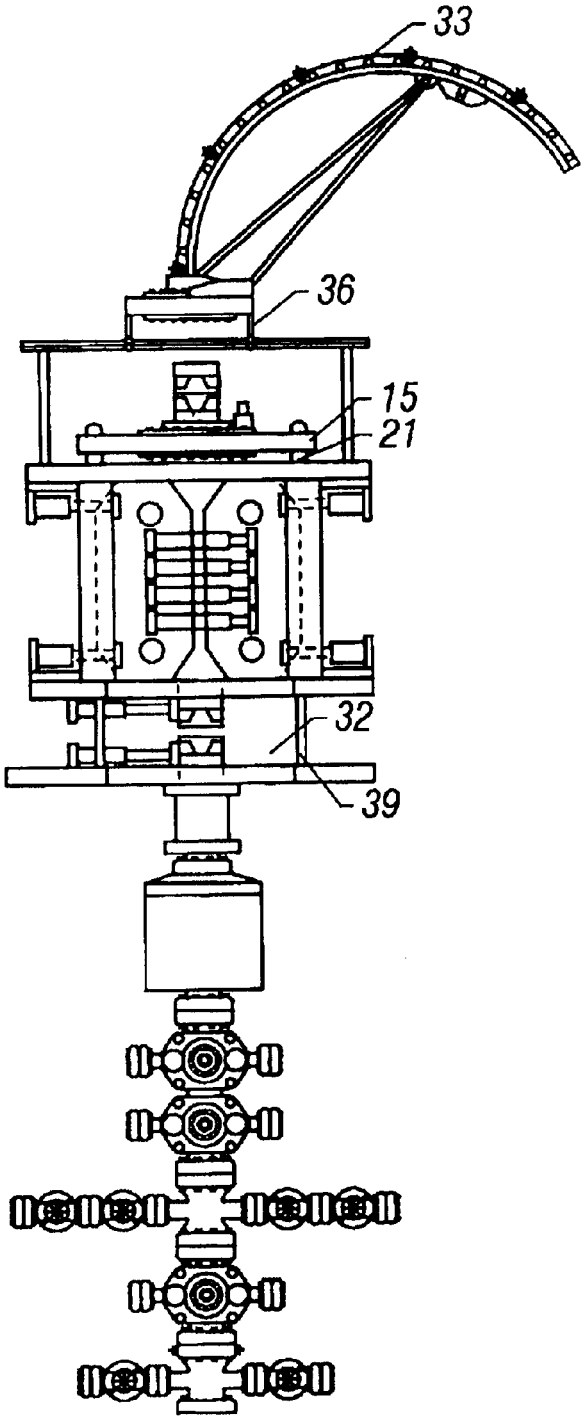
FIG. 6—is a side elevation of the combination coil tubing and snubbing drilling apparatus atop a well head, illustrating the guide arch positioned over the center line of the well head.
Figure 7:
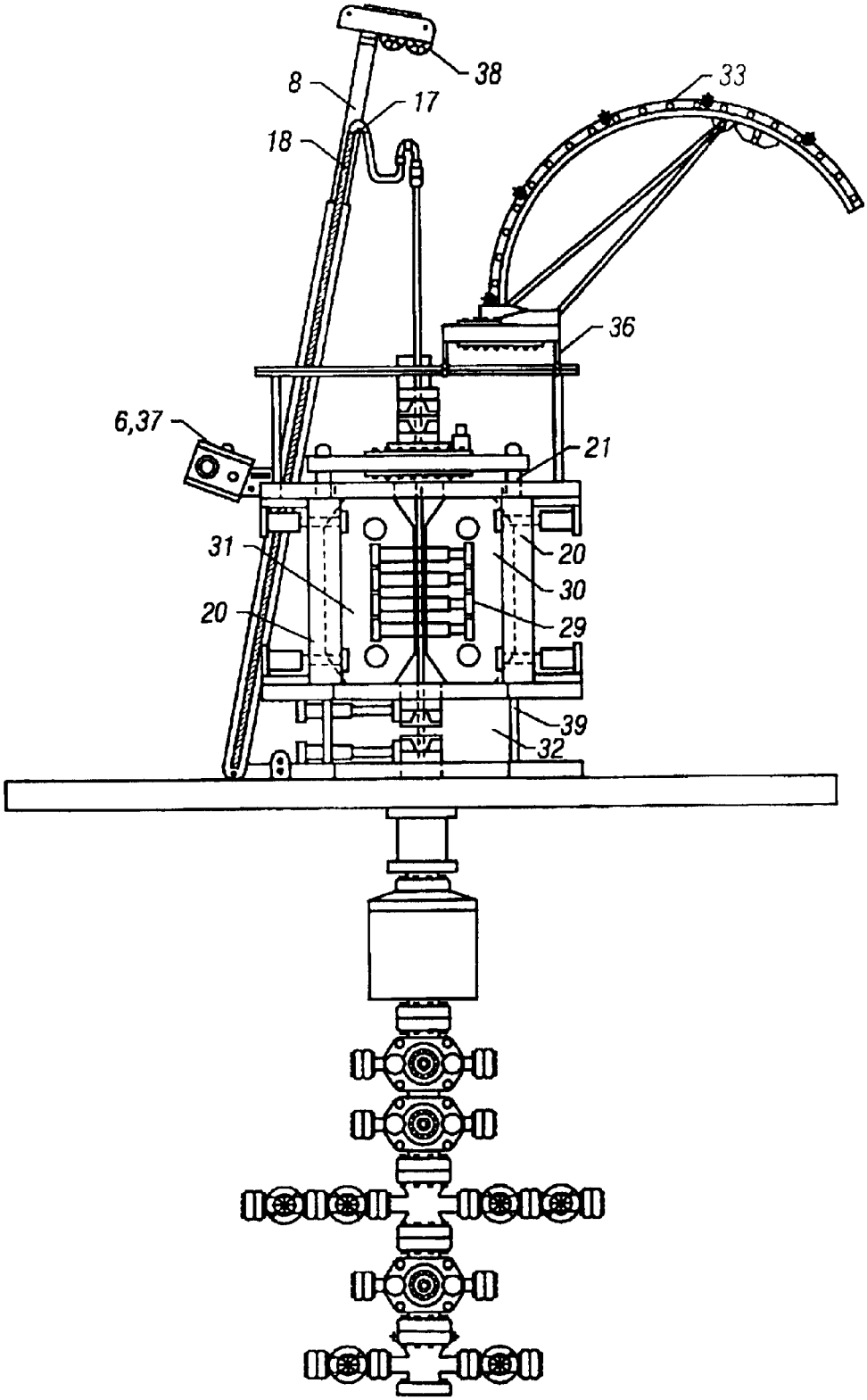
FIG. 7—is a side elevation of the combination coil tubing and snubbing apparatus illustrating the guide arch assembly retracted from the center line of the well head with jointed pipe connected to the stand pipe installed.

As with the multi function injector head described above, the guide arch assembly 33 is provided with a guide system 36 and suitable means to translate the trolley and the guide arch assembly radially from a position over the center line of the well bore as illustrated in FIG. 6 to a position out of the way as illustrated in FIG. 7 so that tubing can be rotated within the well bore. As will be described below, since the tubulars to be spooled in the present invention may be of a larger outer diameter than typical in coil tubing outer diameters; it may or may not be necessary to have a conventional guide arch assembly as long as alignment and a gradual curvature can be maintained from the reel to the injector head.

As illustrated in FIGS. 1 and 7, present invention also comprises a standpipe 18 for the purposes of fluid circulation with high pressure connections on each end of the standpipe to allow pumping.

As illustrated in FIGS. 1, 3, 4, and 7, the apparatus of the present invention incorporates a gin pole or boom 8 to handle convey casing tubing drilling assemblies and completion tools. A winching system comprising a dual winch 37, and a multiplicity of sheaves 38 on the top of the gin pole 8 operates with the counter balance winches 6 (a sub component of 37), as described for the conventional snubbing. FIGS. 2 and 3.

As previously referenced, FIGS. 1, 6 and 7 illustrate a window 32 framed by four horizontal supports 39. The window allows for insertion and extraction of tools in the work string and access to the stationary slips 13.

FIGS. 1 and 4 illustrate a vertical pipe racking or "rack back" system comprising finger boards 40 attached to a frame 41 and/or to the work basket 3, finger boards are parallel beams with spaces for the tubulars. The finger boards permit multiple joints of jointed pipe to be racked together vertically so as to speed up trip time when using jointed pipe as described previously. The rack back system 10 for racking pipe vertically and multiple joints also includes pipe containment bases 42.

Figure 5:
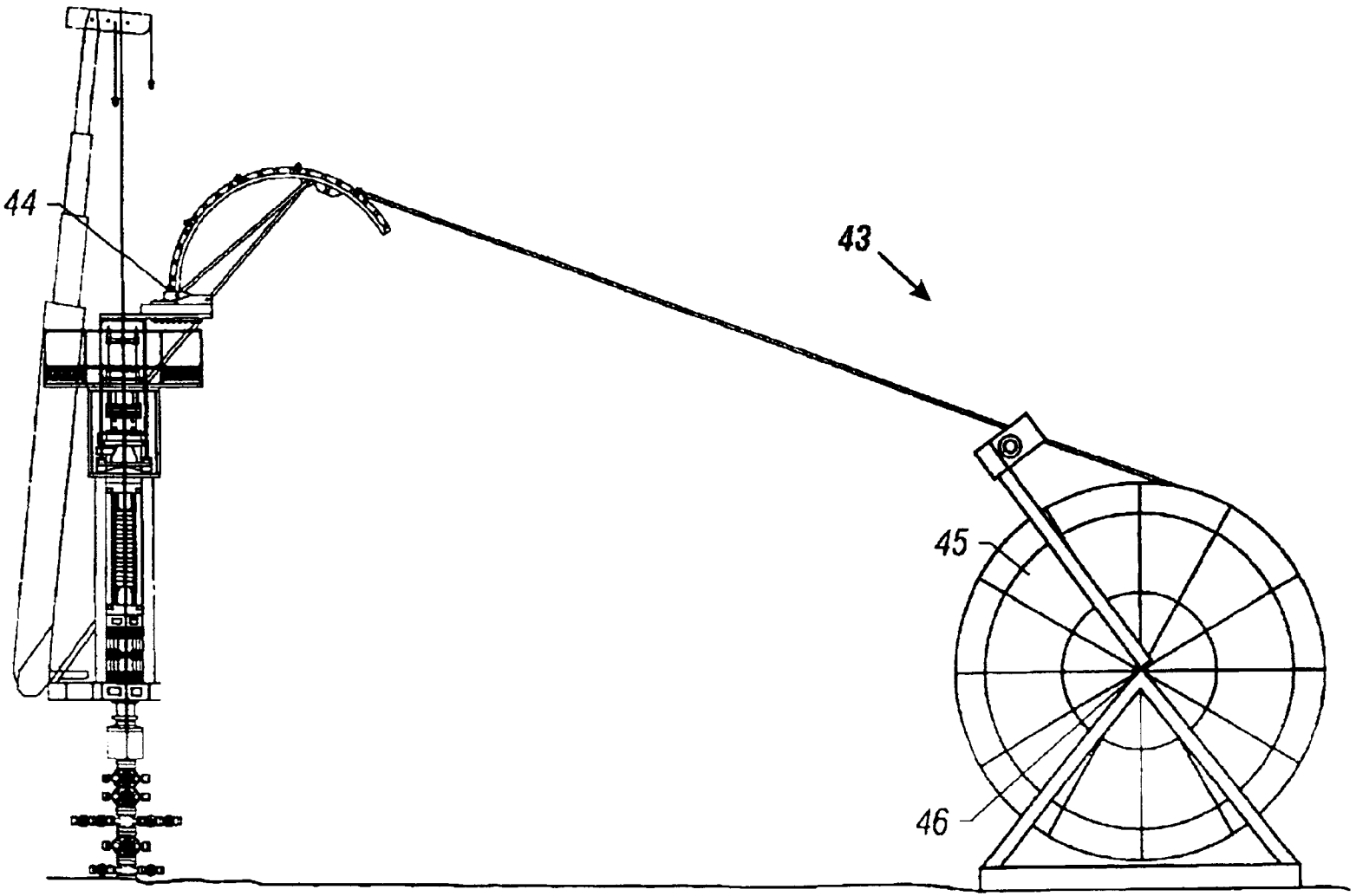
FIG. 5—is a side elevation of the combined coil tubing and snubbing drilling and workover apparatus in combination with the reel for spoolable drill pipe.

FIG. 5, illustrates an additional component of the present invention, a spoolable drill pipe system 43, which comprises a connector 44, a multi section reel 45 and connection 46 to the reel for fluid circulation. Connector 44 is for connecting reeled drill pipe to pipe joints over the center line of the well and within the combination snubbing and injection apparatus.

The invention also contemplates a reel drive mechanism and pipe pulling procedure to allow spooling drill pipe.

The work basket 3 contemplated for the preferred embodiment is to be 8 by 8 foot with attachable 3 by 8 foot finger boards, mounted on each end. The work basket would be configured to allow for boom and boom skid plate, the dual counter balance winch package, "V" door and a modular removable operator control console 4. An alternative embodiment of the present invention contemplates using a remote counter balance control system to allow for freedom of personnel movement while actuating the counter balance winches.

Figure 10:
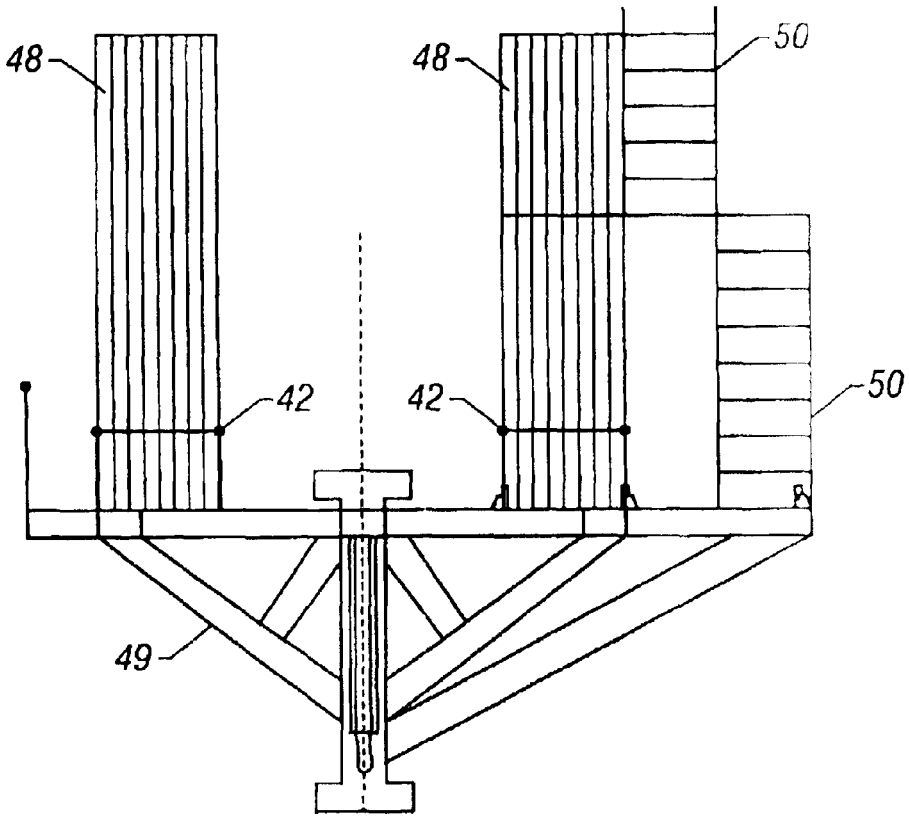
FIG. 10—is a side view of the same base of FIG. 9 at 90° from FIG. 9.
Figure 11:
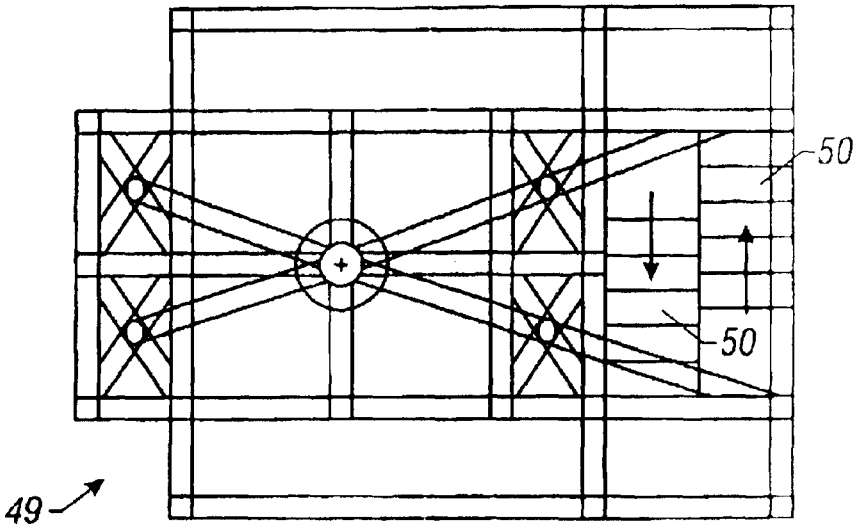
FIG. 11—is a plan view of the sub-base, structure of FIGS. 9 and 10.
Figure 12:
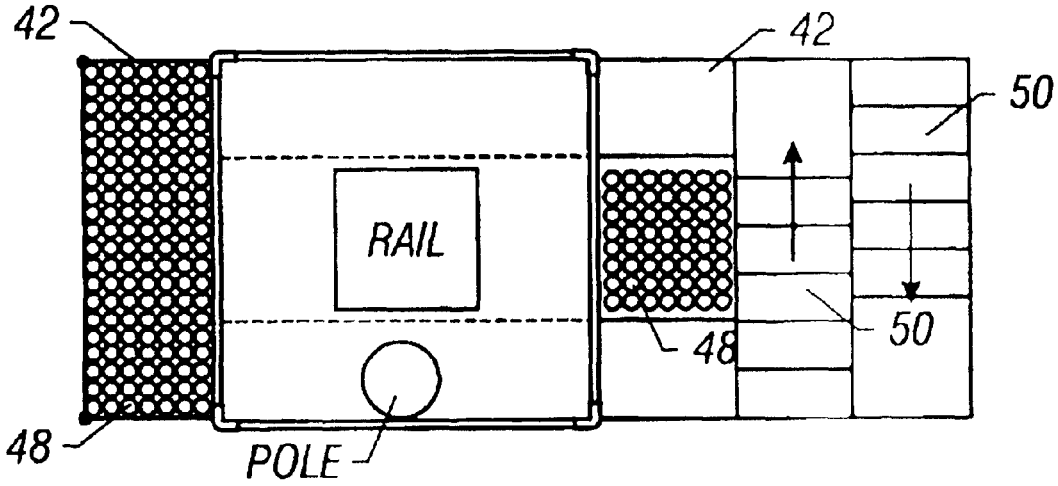
FIG. 12—is a plan view of the drill pipe within the rack pipe system and the access stairway assembly which sits upon the sub-base of FIGS. 9, 10, and 11.

FIGS. 9 through 12 illustrate additional sub assemblies of the present invention, primarily the sub assembly which may be required to support the rack back vertical pipe racking assemblies. In some instances, the dry tubing weight can be supported by the earth, the platform 47 or the well head, depending on which base is used for standing the tubing. In other applications, a supplemental structure may be required. As illustrated in the two side elevations 9 and 10 and in the plan view 11, a three dimensional truss assembly 49 is used to provide the support for the pipe containment bases 42 upon which the vertically racked pipe 48 can be stood. As illustrated in FIG. 10, the substructure assembly 49 is asymmetrical to provide a support for the access ladders or walkways 50 on one side of the unit. In those applications they required the access stairways are mounted to a scaffolding assembly 51. The subassembly can also be configured to rack pipe on only one, or on three sides.

The pipe containment bases for the purpose of racking pipe which are attached to the lower support base of the snubbing jack or in the immediate area. A containment base such as as illustrated in FIGS. 9 through 12, that transfers the weight to the well head is one option. The primary embodiment contemplates building a containment base transferring the weight to the well head, although another option would be to transfer the weight to a platform or other structure besides the well head. The present invention also contemplates using a combination of these two. The frame or scaffold system connects the containment bases to the finger boards. The total system is designed to withstand the load of the tubulars and account for wind forces.

With respect to the above description, it is to be realized that although dimensional embodiments of specific material is disclosed, those enabling embodiments are illustrative, and the optimum dimension relationships for the parts of the invention are to include variations in size, material, shape, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

What is claimed as being new and desired to be protected by Letters Patent is as follows:

1. A new and improved apparatus for drilling permitting running jointed pipe and coiled tubing in combination, comprising an integrated hydraulic workover unit and a coiled tubing injection unit, wherein said integrated workover unit and coiled tubing unit comprises a multi-function injector head framed within a window defined by components of said hydraulic workover unit, and wherein said multi-function injector head comprises two halves movable radially relative to the centerline of the wellbore and wherein said multi-function injector head further comprises hydraulic pistons actuatable to translate said halves radially relative to the centerline of the wellbore.

2. The invention of claim 1 wherein said hydraulic workover unit further comprises a hydraulic jack assembly comprising a frame and at least two vertically oriented hydraulic cylinders, stationary slips, and traveling slips mounted to a traveling head, and further comprises a rotary table within the traveling head.

3. The invention of claim 1 wherein said coiled tubing unit further comprises a guide arch assembly mounted to a guide system above said hydraulic workover unit wherein said assembly is movable from a first position over the centerline of the wellbore to a second position away from the centerline of the wellbore.

4. The invention of claim 2 wherein said coiled tubing unit further comprises a guide arch assembly mounted to a guide system above said hydraulic workover unit wherein said assembly is movable from a first position over the centerline of the wellbore to a second position away from the centerline of the wellbore.

5. The invention of claim 2 further comprising a standpipe for the purposes of fluid circulation, a rotating swivel to allow fluid circulation during pipe rotation, and a winching system and a gin pole to handle and convey tubulars.

6. The invention of claim 3 further comprising a standpipe for the purposes of fluid circulation, a rotating swivel to allow fluid circulation during pipe rotation, and a winching system and a gin pole to handle and convey tubulars.

7. The invention of claim 2 further comprising a work basket atop said jack assembly.

8. The invention of claim 7 further comprising pipe handling power tongs onboard the work basket.

9. The invention of claim 7 further comprising at least one operator's console onboard the work basket.

10. The invention of claim 1 further comprising a frame, and pipe racking beams and pipe containment bases attached to said frame, for the purpose of vertically standing multiple joints [op] *of* pipe in units.

11. The invention of claim 2 further comprising a frame, pipe racking beams attached to said work basket, and pipe containment bases attached to said frame, for the purpose of vertically standing multiple joints [op] *of* pipe in units.

12. The invention of claim 1 further comprising a sub-base for directing weight distribution and supporting the unit.

13. The invention of claim 2 further comprising a sub-base for directing weight distribution and supporting the unit.

14. The invention of claim 10 further comprising a sub-base for directing weight distribution and supporting the unit.

15. The invention of claim 11 further comprising a sub-base for directing weight distribution and supporting the unit.

16. The invention of claim 1 further comprising apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.

17. The invention of claim 2 further comprising apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.

18. The invention of claim 4 further comprising apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.

19. A method for drilling combining an integrated hydraulic jacking unit and a coiled tubing unit, permitting running jointed pipe and coil tubing in combination, comprising the sequential steps in various order and combination of:

running a single joint of drill pipe into the wellbore with the hydraulic jacking unit;

attaching in sequence single joints of drill pipe to drill pipe within the well bore to form a drill string and running said string into the wellbore with the hydraulic jacking unit;

rotating said drill string;

attaching the uppermost end of said drill string to a spoolable connection attached to a coiled tubing pipe pulling and pipe receiving spool apparatus;

tripping out of the well bore with the drill string by pulling said string with said pipe pulling apparatus and spooling said drill pipe upon said spool apparatus;

tripping back into the well bore with the drill string by injecting said string with said coil tubing unit and unspooling said drill string from said spool;

pulling said string from the wellbore with the hydraulic jacking unit and disconnecting in sequence single joints of drill pipe from drill pipe within the well bore to disassemble a drill string into single joints.

*20. A system for performing wellbore operations permitting the running of pipe, said system comprising:*

*a hydraulic workover unit comprising a hydraulic jack assembly having a frame and at least two vertically oriented hydraulic cylinders, stationary slips, and traveling slips mounted to a traveling head, said traveling head having a rotary table; and*

*a coiled tubing unit having a guide arch assembly mounted to a guide system above said hydraulic workover unit wherein said assembly is movable from a first position over the centerline of the wellbore to a second position away from the centerline of the wellbore.*

*21. The invention of claim 20 further including a standpipe for the purposes of fluid circulation, a rotating swivel to allow fluid circulation during pipe rotation, and a winching system and a gin pole to handle and convey tubulars.*

*22. The invention of claim 20 further including a work basket atop said jack assembly.*

*23. The invention of claim 20 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*24. The invention of claim 20 further including a sub-base for directing weight distribution and supporting the unit.*

*25. The invention of claim 20 further including:*

*a frame, and pipe racking beams and pipe containment bases attached to said frame, for the purpose of vertically standing multiple joints of pipe in units.*

*26. The invention of claim 25 further including a work basket atop said jack assembly.*

*27. The invention of claim 25 further including a standpipe for the purposes of fluid circulation, a rotating swivel to allow fluid circulation during pipe rotation, and a winching system and a gin pole to handle and convey tubulars.*

*28. The invention of claim 26 wherein said work basket is connected to said racking beams.*

*29. The invention of claim 27 further including a work basket corrected atop said jack assembly and connected to said racking beams.*

*30. The invention of claim 25 further including a sub-base for directing weight distribution and supporting the vertically standing joints of pipe.*

*31. The invention of claim 26 further including a sub-base for directing weight distribution and supporting the vertically standing joints of pipe.*

*32. The invention of claim 27 further including a sub-base for directing weight distribution and supporting the vertically standing joints of pipe.*

*33. The invention of claim 28 further including a sub-base for directing weight distribution and supporting the vertically standing joints of pipe.*

*34. The invention of claim 29 further including a sub-base for directing weight distribution and supporting the vertically standing joints of pipe.*

*35. The invention of claim 25 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*36. The invention of claim 26 further including an apparatus for spooling drill pipe, said apparatus comprising a spoolable connector for attachment to bottom hole assemblies, other drill pipe and completion tools, a multi-section reel with a core, a connection to said reel for fluid*

*circulation, a reel drive mechanism and a drill pipe pulling and snubbing capability.*

*37. The invention of claim 32 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*38. The invention of claim 20 further including:*

*a frame, pipe racking beams connected to said frame, and containment bases, for the purpose of vertically standing multiple joints of pipe in units.*

*39. The invention of claim 38 further including a work basket atop said jack assembly and connected to said racking beams.*

*40. The invention of claim 38 further including a standpipe for the purposes of fluid circulation, a rotating swivel to allow fluid circulation during pipe rotation, and a winching system and a gin pole to handle and convey tubulars.*

*41. The invention of claim 39 further including a standpipe for the purposes of fluid circulation, a rotating swivel to allow fluid circulation during pipe rotation, and a winching system and a gin pole to handle and convey tubulars.*

*42. The invention of claim 38 further including a sub-base for directing weight distribution and supporting the vertically standing joints of pipe.*

*43. The invention of claim 39 further including a sub-base for directing weight distribution and supporting the vertically standing joints of pipe.*

*44. The invention of claim 40 further including a sub-base for directing weight distribution and supporting the vertically standing joints of pipe.*

*45. The invention of claim 41 further including a sub-base for directing weight distribution and supporting the vertically standing joints of pipe.*

*46. The invention of claim 38 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*47. The invention of claim 45 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*48. The invention of claim 20 further including:*

*a work basket connected atop said jack assembly; and*

*pipe racking beams connected to said work basket, and pipe containment bases, for the purpose of vertically standing multiple joints of pipe in units.*

*49. The invention of claim 48 further including a standpipe for the purposes of fluid circulation, a rotating swivel to allow fluid circulation during pipe rotation, and a winching system and a gin pole to handle and convey tubulars.*

*50. The invention of claim 48 further including a sub-base for directing weight distribution and supporting the vertically standing joints of pipe.*

*51. The invention of claim 49 further including a sub-base for directing weight distribution and supporting the vertically standing joints of pipe.*

*52. The invention of claim 48 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*53. The invention of claim 49 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*54. The invention of claim 50 further including an apparatus for spooling drill pipe, said apparatus comprising a spoolable connector for attachment to bottom hole assemblies, other drill pipe and completion tools, a multi-section reel with a core, a connection to said reel for fluid circulation, a reel drive mechanism and a drill pipe pulling and snubbing capability.*

*55. A system for performing wellbore operations permitting the running of pipe, said system comprising:*

*a hydraulic workover unit comprising a hydraulic jack assembly having a frame and at least two vertically oriented hydraulic cylinders, stationary slips, and traveling slips mounted to a traveling head, said traveling head having a rotary table; and*

*a frame structure, and pipe racking beams and pipe containment bases attached to said frame structure, for the purpose of vertically standing multiple joints of pipe in units.*

*56. The invention of claim 55 further including a work basket atop said jack assembly.*

*57. The invention of claim 55 further including a standpipe for the purposes of fluid circulation, a rotating swivel to allow fluid circulation during pipe rotation, and a winching system and a gin pole to handle and convey tubulars.*

*58. The invention of claim 56 wherein said work basket is connected to said racking beams.*

*59. The invention of claim 57 further including a work basket corrected atop said jack assembly and connected to said racking beams.*

*60. The invention of claim 55 further including a sub-base for directing weight distribution and supporting the vertically standing joints of pipe.*

*61. The invention of claim 58 further including a sub-base for directing weight distribution and supporting the vertically standing joints of pipe.*

*62. The invention of claim 59 further including a sub-base for directing weight distribution and supporting the vertically standing joints of pipe.*

*63. A system for performing wellbore operations permitting the running of pipe, said system comprising:*

*a hydraulic workover unit comprising a hydraulic jack assembly having a frame and at least two vertically oriented hydraulic cylinders, stationary slips, and traveling slips mounted to a traveling head, said traveling head having a rotary table; and*

*a frame structure, pipe racking beams connected to said frame structure, and containment bases for the purpose of vertically standing multiple joints of pipe in units.*

*64. The invention of claim 63 further including a work basket atop said jack assembly.*

*65. The invention of claim 63 further including a standpipe for the purposes of fluid circulation, a rotating swivel to allow fluid circulation during pipe rotation, and a winching system and a gin pole to handle and convey tubulars.*

*66. The invention of claim 64 further including a standpipe for the purposes of fluid circulation, a rotating swivel to*

*allow fluid circulation during pipe rotation, and a winching system and a gin pole to handle and convey tubulars.*

*67. The invention of claim 64 wherein said work basket is connected to said racking beams.*

*68. The invention of claim 66 wherein said work basket is connected to said racking beams.*

*69. The invention of claim 63 further including a sub-base for directing weight distribution and supporting the vertically standing joints of pipe.*

*70. The invention of claim 64 further including a sub-base for directing weight distribution and supporting the vertically standing joints of pipe.*

*71. The invention of claim 65 further including a sub-base for directing weight distribution and supporting the vertically standing joints of pipe.*

*72. The invention of claim 66 further including a sub-base for directing weight distribution and supporting the vertically standing joints of pipe.*

*73. The invention of claim 68 further including a sub-base for directing weight distribution and supporting the vertically standing joints of pipe.*

*74. A system for performing wellbore operations permitting the running of pipe, said system comprising:*

*a hydraulic workover unit comprising a hydraulic jack assembly having a frame and at least two vertically oriented hydraulic cylinders, stationary slips, and traveling slips mounted to a traveling head, said traveling head having a rotary table;*

*a work basket connected atop said jack assembly; and*

*pipe racking beams connected to said work basket, and pipe containment bases, for the purpose of vertically standing multiple joints of pipe in units.*

*75. The invention of claim 74 further including a standpipe for the purposes of fluid circulation, a rotating swivel to allow fluid circulation during pipe rotation, and a winching system and a gin pole to handle and convey tubulars.*

*76. The invention of claim 74 further including a sub-base for directing weight distribution and supporting the vertically standing joints of pipe.*

*77. The invention of claim 75 further including a sub-base for directing weight distribution and supporting the vertically standing joints of pipe.*

* * * * *